(12) United States Patent
Guthrie et al.

(10) Patent No.: US 8,683,160 B2
(45) Date of Patent: *Mar. 25, 2014

(54) METHOD AND APPARATUS FOR SUPPORTING MEMORY USAGE ACCOUNTING

(75) Inventors: Guy L. Guthrie, Austin, TX (US);
Karthick Rajamani, Austin, TX (US);
Gregory S. Still, Raleigh, NC (US);
Jeffrey A. Stuecheli, Austin, TX (US);
Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 13/165,982

(22) Filed: Jun. 22, 2011

(65) Prior Publication Data

US 2012/0330802 A1 Dec. 27, 2012

(51) Int. Cl.
*G06F 12/00* (2006.01)

(52) U.S. Cl.
USPC .......................................................... 711/163

(58) Field of Classification Search
None
See application file for complete search history.

(56) References Cited

U.S. PATENT DOCUMENTS

| 7,065,761 | B2 | 6/2006 | Foster | |
|---|---|---|---|---|
| 7,158,627 | B1* | 1/2007 | Lu | 379/221.07 |
| 2002/0124040 | A1 | 9/2002 | Foster | |
| 2002/0161932 | A1* | 10/2002 | Herger et al. | 709/321 |
| 2009/0106499 | A1* | 4/2009 | Aoki et al. | 711/137 |
| 2010/0218018 | A1 | 8/2010 | Parker, Jr. | |
| 2011/0154352 | A1* | 6/2011 | Desota et al. | 718/104 |

OTHER PUBLICATIONS

U.S. Appl. No. 13/166,054 entitled "Method and Apparatus for Supporting Memory Usage Throttling" Notice of Allowance dated Sep. 25, 2013 (9 pg).
U.S. Appl. No. 13/585,268 entitled "Method and Apparatus for Supporting Memory Usage Throttling" Notice of Allowance dated Sep. 25, 2013 (8 pg).
U.S. Appl. No. 13/585,268 entitled "Method and Apparatus for Supporting Memory Usage Throttling" Non-final office action dated Sep. 10, 2013 (8 pg).
U.S. Appl. No. 13/166,054 entitled "Method and Apparatus for Supporting Memory Usage Throttling" Non-final office action dated Sep. 9, 2013 (11 pg).

* cited by examiner

*Primary Examiner* — Brian Peugh
(74) *Attorney, Agent, or Firm* — Yudell Isidore Ng Russell PLLC

(57) ABSTRACT

An apparatus for providing memory energy accounting within a data processing system having multiple chiplets is disclosed. The apparatus includes a system memory, a memory access collection module, a memory throttle counter, and a memory credit accounting module. The memory access collection module receives a first set of signals from a first cache memory within a chiplet and a second set of signals from a second cache memory within the chiplet. The memory credit accounting module tracks the usage of the system memory on a per user basis according to the results of cache accesses extracted from the first and second set of signals from the first and second cache memories within the chiplet.

9 Claims, 2 Drawing Sheets

METHOD AND APPARATUS FOR SUPPORTING MEMORY USAGE ACCOUNTING

RELATED PATENT APPLICATION

The present patent application is related to copending application U.S. Ser. No. 13/166,054, filed on even date.

BACKGROUND OF THE INVENTION

1. Technical Field

The present disclosure relates to computer resource usage accounting in general, and in particular to a method and apparatus for supporting memory energy accounting on a per user virtual partition basis.

2. Description of Related Art

Many business and scientific computing applications are required to access large amounts of data, but different computing applications have different demands on computation and storage resources. Thus, many computing service providers, such as data centers, have to accurately account for the resource usage incurred by different internal and external users in order to bill each user according to each user's levels of resource consumption.

Several utility computing models have been developed to cater to the need for pay-per-use method of resource usage accounting. With these utility computing models, the usage of computing resources, such as processing time, is metered in the same way the usage of traditional utilities, such as electric power and water, is metered. One difficulty with the utility computing models is the heterogeneity and complexity of mapping resource usage to specific users. Data centers may include hundreds if not thousands of devices, any of which may be deployed for use with a variety of complex applications at different times. The resources being used by a particular application may be changed dynamically and rapidly, and may be spread over a large number of devices. A variety of existing tools and techniques are available at each device to monitor usage. But the granularity at which resource usage measurement is possible may also differ from devices to devices. For example, in some environments, it may be possible to measure the response time of individual disk accesses, while in other environments only averages of disk access times may be obtained.

The present disclosure provides an improved method and apparatus for supporting memory usage accounting.

SUMMARY OF THE INVENTION

In accordance with a preferred embodiment of the present disclosure, an apparatus for supporting memory energy accounting within a data processing system having multiple chiplets includes a system memory, a memory access collection module, a memory throttle counter, and a memory credit accounting module. The memory access collection module receives a first set of signals from a first cache memory within a chiplet and a second set of signals from a second cache memory within the chiplet. The memory credit accounting module tracks the usage of the system memory on a per user virtual partition basis according to the results of cache accesses extracted from the first and second set of signals from the first and second cache memories within the chiplet.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

In today's computing systems, memory energy is accounted for largely by determining the activities that target a specific memory area using counters in memory controllers that directly interface to the backing direct random-access memories (DRAMs). In addition, memory energy throttling policies (based on memory energy accounting) are achieved by regulating core system bus accesses to a system memory and to other shared caches within a user virtual partition. In a virtualized system where a number of user virtual partitions are concurrently running on the platform via, for example, time division multiplexing, the current mechanisms for implementing memory energy accounting cannot provide an accurate account of the memory activities associated with each user virtual partition. Instead, only a less precise total accounting of the user virtual partition activities on the system bus is available.

In addition, by using performance counters that scale with frequency, today's computer resource usage accounting systems can account (and thus charge) the running user virtual partitions for the amount of performance as well as the processor power that are used. This is done by associating the power of a core to a user virtual partition. However, since the memory subsystem is a resource shared by many user virtual partitions, current computer resource usage accounting systems cannot provide accurate throttling for the power used by each user virtual partition in order to regulate the portion of the system power that the system memory uses according to each user.

The present invention provide an improved method and apparatus for providing accurate memory energy accounting and memory energy throttling on a per user virtual partition basis.

Figure 1:
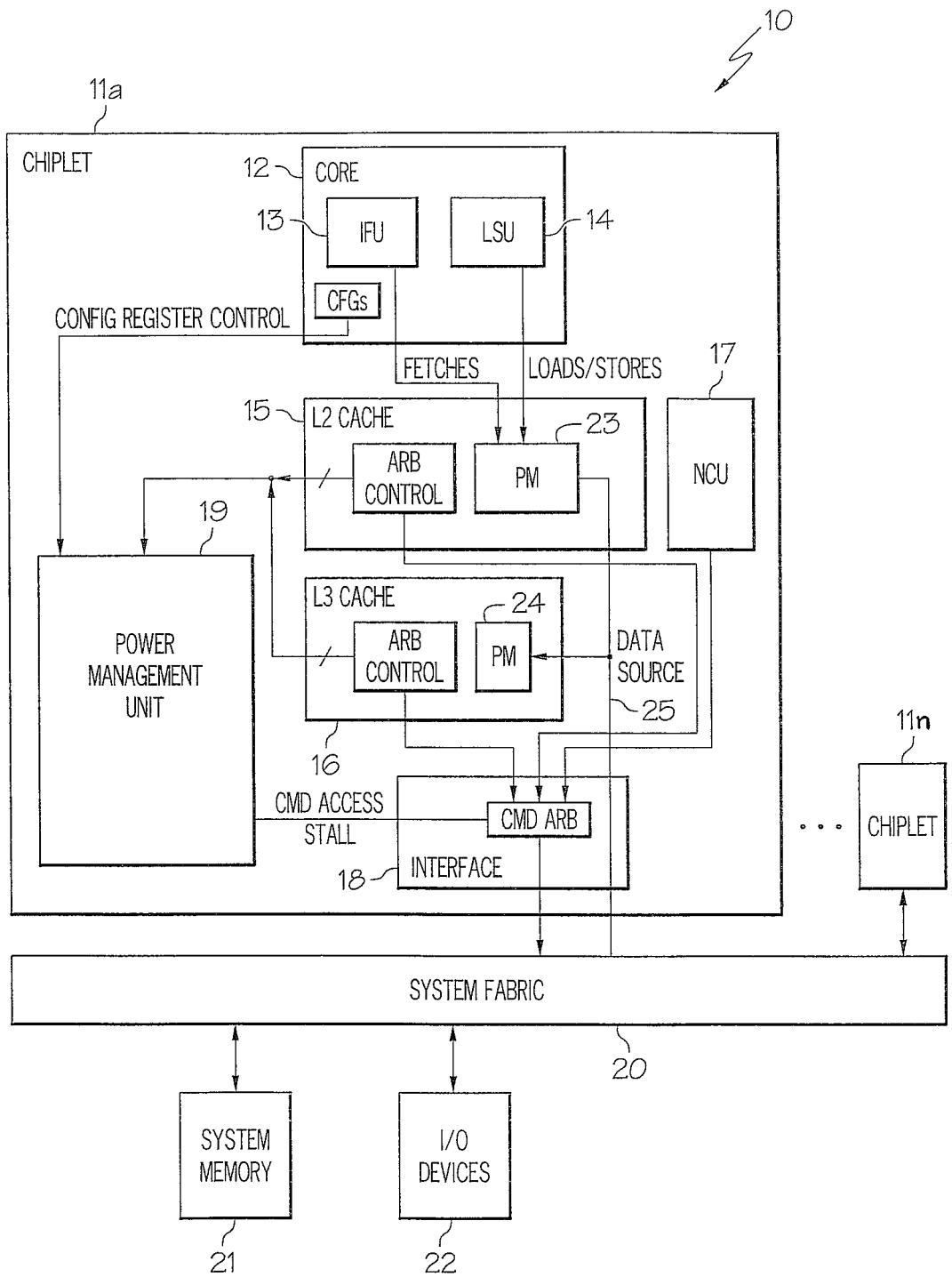
FIG. 1 is a block diagram of a data processing system in which a preferred embodiment of the present invention can be implemented.

Referring now to the drawings and in particular to FIG. 1, there is depicted a block diagram of a data processing system in which a preferred embodiment of the invention can be implemented. As shown, a data processing system 10 includes multiple chiplets 11a-11n coupled to a system memory 21 and various input/output (I/O) devices 22 via a system fabric 20. Chiplets 11a-11n are substantially identical from each other; thus, only chiplet 11a will be further described in details.

Chiplet 11a includes a processor core 12 having an instruction fetching unit (IFU) 13 and a load/store unit (LSU) 14, a level-2 (L2) cache 15, and a level-3 cache 16. Chiplet 11a also includes a non-cacheable unit (NCU) 17, a fabric interface 18 and a power management unit 19. Processor core 12 includes an instruction cache (not shown) for IFU 13 and a data cache (not shown) for LSU 14. Along with the instruction and data caches within processor core 12, both L2 cache 15 and L3 cache 16 enable processor core 12 to achieve a relatively fast access time to a subset of instructions/data previously transferred from system memory 21. Fabric interface 18 facilitates communications between processor core 12 and system fabric 20.

A prefetch module 23 within L2 cache 15 prefetches data/instructions for processor core 12, and keeps track of whether or not the prefetched data/instructions are originated from system memory 21 via a feedback path 25. Similarly, a prefetch module 24 within L3 cache 16 prefetches data/instructions for processor core 12, and keeps track of whether or not the prefetched data/instructions are originated from system memory 21 via feedback path 25.

Figure 2:
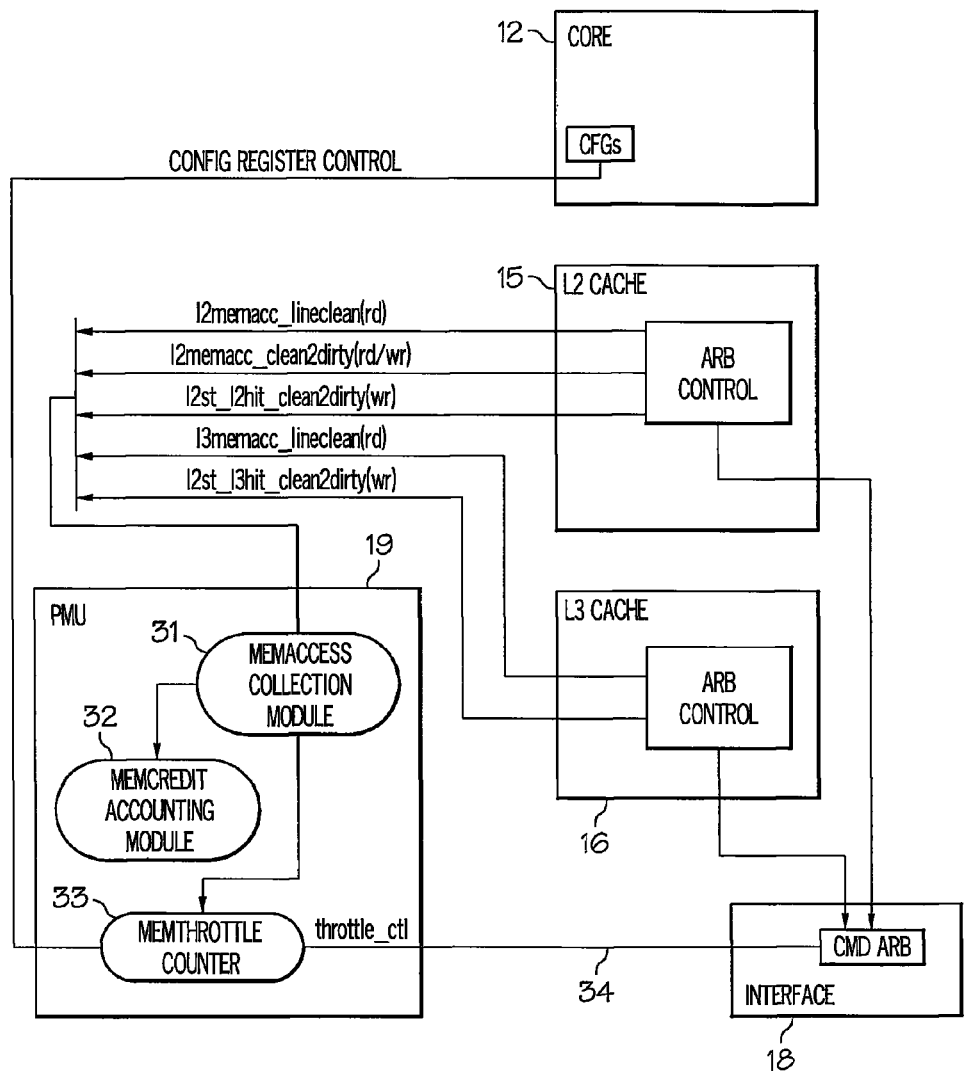
FIG. 2 is a block diagram of a power management unit within the data processing system from FIG. 1, in accordance with a preferred embodiment of the present invention.

With reference now FIG. 2 is a diagram of a block diagram of a power management unit within data processing system 10, in accordance with a preferred embodiment of the present invention. As shown, power management unit 19 includes a memory access collection module 31, a memory credit accounting module 32 and a memory throttle counter 33. Power management unit 19 provides memory throttling for processor core 12. With the view that a single user virtual partition is running on processor core 12 at any instant in time, capturing counter values at the start and end of the user virtual partition execution window will allow hypervisor software to compute the number of operations that a specific user virtual partition used, and such information can be associated with that specific user virtual partition.

Given a user virtual partition may span across multiple processor cores, the hypervisor software adds up all memory activities from all processor cores that the specific user virtual partition uses in order to determine the total memory activity generated by the specific user virtual partition. Summing across all of the user virtual partitions over any window of time allows the hypervisor software to determine the percentage of the total system memory power used over that window of time in order to provide an accurate to memory energy accounting on a per user virtual partition basis. With this accounting information, the hypervisor software can subsequently configure certain hardware to regulate actual memory activities for the processor cores in this specific user virtual partition based on what the user has been allotted.

After an access request as proceed through the cache hierarchy (i.e., L1-L3 caches) associated with processor core 12 and has been found to "miss," a request for the given block (typically a cache line) is placed on system fabric 20. The elements on system fabric 20 will determine if they have the latest copy of this block and, if so, provide it to satisfy the access request. If the block for the access request is found in a cache within another one of chiplets 11b-11n, the block is said to be "intervened" and thus, no access to system memory 21 is required. In other words, no system memory activity is generated as a result of the above-mentioned access request. However, if the memory request was not "intervened" from a cache within another one of chiplets 11b-11n, then the access request will have to be serviced by system memory 21. The knowledge of how each access request was serviced (i.e., whether the data/instruction came from caches within one of chiplets 11a-11n or system memory 21) is communicated by a field within a Response received by prefetch modules 23, 24 from system fabric 20 during the address tenure.

System memory traffic can be approximated by chiplet consumption (read shared for loads and Read with Intent to Modify (RWITM) loads done for stores), knowing that these will ultimately result in a percentage set of castouts (to push stores). However, the percentage of castouts (e.g., stores) versus reads is workload dependent. In order to account for this workload variation, memory throttle counter 33 is incremented differently for reads and for writes.

In order to determinate the "addition" of new credits for memory throttles, memory throttle counter 33 adds one credit for every programmable number of cycles (e.g., one memory credit for every 32 cycles). In order to determinate the "subtraction" of credits for memory throttles, memory throttle counter 33 decrements credit value based on the type of operation to caches and/or system memory 21.

For each access to L2 cache 15 or L3 cache 16, there are five basic types of accesses that cause increments to memory throttle counter 33. The five basic types can be grouped into the following three categories of behavior:

1. For each read access to L2 cache 15 or L3 cache 16 that results in system memory 21 being the source of the data for the read access, memory throttle counter 33 will increment by 1. The type of these accesses includes L2 Read Claim machine Read and L3 Prefetch machine fabric operations.
2. Storage update operations involves two phases: the reading of data from a location within system memory 21 into the cache hierarchy (for processor core 12 to modify) and then, ultimately, the physical writing of the data back to system memory 21. Since each phase needs to be accounted for, memory throttle counter 33 will increment by 2. The type of these accesses includes L2 Read Claim machines fabric RWITM operations.
3. The situation of the cache line transitions from a "clean" state to a "dirty" state after a cache hit (i.e., data is already resident in a cache line within either L2 cache 15 or L3 cache 16) indicates that the cache line will have to be castout eventually. Thus, memory throttle counter 33 will increment by 1. The type of these accesses includes L2 Read Claim machines performing storage undate RWITM operations on behalf on core 12 that "hit" a clean copy of a cache line in L2 cache 15 or L3 cache 16.

In the example shown in FIG. 2, a memory access collection module 31 within PMU 19 receives signals such as 12memacc_lineclean (L2 access, line clean), 12memacc_clean2dirty (L2 access, line changes from clean to dirty), 12st_12hit_clean2dirty (L2 hit, line changes from clean to dirty) signals from L2 cache 15 and 13memacc_lineclean (L3 access, line clean) and 12st_13hit_clean2dirty (L3 hit, line changes from clean to dirty) signals from L3 cache 16 in order to make the above-mentioned accessments and perform increments or decrements accordingly.

Memory credit accounting module 32 tracks the usage of system memory 21 on a per user basis according to the results of cache accesses obtained from memory access collection module 31. Based on the information gathered by memory credit accounting module 32, each user of data processing system 10 can be billed according to the usage of system memory 21 by way of tracking the results of accesses to L2 cache 15 and L3 cache 16.

In order to perform the memory access throttling, memory throttle counter 33 regulates chiplet 11a access to system fabric 20 via a throttle control signal 34 to fabric interface 18. The amount and frequency of throttling is based on a predetermined amount of access to system memory 21 chiplet 11a's user virtual partition has been allotted over a given amount of time. If a given chiplets accesses to system memory 21 are approaching or have reached the predetermined limit, then chiplet 11a's access to system fabric 20 will be slowed down or stopped until time-based credits has replenished back into memory throttle counter 33.

As has been described, the present disclosure provides a method and apparatus for providing memory energy accounting on a per user virtual partition basis.

It is also important to note that although the present invention has been described in the context of a fully functional computer system, those skilled in the art will appreciate that the mechanisms of the present invention are capable of being distributed as a program product in a variety of recordable type media such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:

1. An apparatus for providing memory energy accounting within a data processing system having a plurality of chiplets, said apparatus comprising:

a system memory;

a memory access collection module for receiving a first set of signals from a first cache memory within one of said chiplets and for receiving a second set of signals from a second cache memory within said one chiplet;

a memory throttle counter coupled to said memory access collection module; and a memory credit accounting module, coupled to said memory throttle counter, for tracking the usage of said system memory on a per user basis according to the results of cache accesses obtained from said first and second set of signals from said first and second cache memories within said one chiplet.

2. The apparatus of claim 1, wherein memory credit accounting module increments or decrements a memory usage count within said memory throttle counter according to the frequency of actual and potential access to said system memory.

3. The apparatus of claim 1, wherein memory credit accounting module generates billings for each user of said data processing system according to said tracked usage of said system memory.

4. A method for providing memory energy accounting within a data processing system having a plurality of chiplets, said method comprising:

receiving a first set of signals from a first cache memory within one of said chiplets;

receiving a second set of signals from a second cache memory within said one chiplet; and tracking the usage of said system memory on a per user basis according to the results of cache accesses obtained from said first and second set of signals from said first and second cache memories within said one chiplet.

5. The method of claim 4, wherein method further includes incrementing or decrementing a memory usage count within said memory throttle counter according to the frequency of actual and potential access to said system memory.

6. The method of claim 4, wherein method further includes generating billings for each user of said data processing system according to said tracked usage of said system memory.

7. A computer readable medium having a computer program product providing memory energy accounting within a data processing system having a plurality of chiplets, said computer readable medium comprising:

computer program code for receiving a first set of signals from a first cache memory within one of said chiplets;

computer program code for receiving a second set of signals from a second cache memory within said one chiplet; and computer program code for tracking the usage of said system memory on a per user basis according to the results of cache accesses obtained from said first and second set of signals from said first and second cache memories within said one chiplet.

8. The computer readable medium of claim 7, wherein computer readable medium further includes computer program code for incrementing or decrementing a memory usage count within said memory throttle counter according to the frequency of actual and potential access to said system memory.

9. The computer readable medium of claim 7, wherein computer readable medium further includes computer program code for generating billings for each user of said data processing system according to said tracked usage of said system memory.

* * * * *